United States Patent [19]

Morse

[11] Patent Number: 4,963,268

[45] Date of Patent: * Oct. 16, 1990

[54] METHOD AND SYSTEM FOR VARIABLE FREQUENCY ELECTROMAGNETIC WATER TREATMENT

[75] Inventor: Dwain Morse, Santa Barbara, Calif.

[73] Assignee: Aqua Dynamics Group Corp., Wilmington, Del.

[*] Notice: The portion of the term of this patent subsequent to Sep. 12, 2006 has been disclaimed.

[21] Appl. No.: 312,225

[22] Filed: Feb. 21, 1989

Related U.S. Application Data

[63] Continuation-in-part of Ser. No. 183,919, Apr. 20, 1988, Pat. No. 4,865,748.

[51] Int. Cl.$^5$ .......................... B01D 17/06; C02F 1/48
[52] U.S. Cl. ..................... 210/739; 204/149; 204/156; 210/85; 210/243; 210/748
[58] Field of Search ................ 210/85, 143, 243, 739, 210/748, 222, 695, 696, 793; 55/2, 101; 204/149, 157.4, 157.44, 249; 122/379; 250/492.1; 134/1, 166 C, 184; 422/22, 186

[56] References Cited

U.S. PATENT DOCUMENTS

| | | | |
|---|---|---|---|
| 3,272,338 | 9/1966 | Gallagher | 210/195.3 |
| 3,451,849 | 6/1969 | Unterschuetz | 134/1 |
| 3,503,804 | 3/1970 | Schneider | 134/1 |
| 3,523,076 | 8/1970 | Goerz et al. | 210/748 |
| 3,625,388 | 12/1971 | Waltrip | 210/748 |
| 3,826,740 | 7/1974 | Jewett | 210/748 |
| 4,055,491 | 10/1977 | Porath-Furedi | 210/748 |
| 4,365,975 | 12/1982 | Williams | 204/157.1 |
| 4,582,629 | 4/1986 | Wolf | 210/748 |
| 4,601,834 | 7/1986 | Bailes et al. | 210/748 |
| 4,673,512 | 6/1987 | Schram | 210/748 |
| 4,699,665 | 10/1987 | Scharton et al. | 134/1 |
| 4,726,904 | 2/1988 | Ayers | 210/748 |
| 4,743,361 | 5/1988 | Schram | 210/748 |
| 4,865,747 | 9/1989 | Larson et al. | 210/748 |
| 4,865,748 | 9/1989 | Morse | 210/739 |

FOREIGN PATENT DOCUMENTS

| | | | |
|---|---|---|---|
| 886683 | 11/1971 | Canada | 210/748 |
| 463884 | 7/1928 | Fed. Rep. of Germany | 210/748 |
| 2227230 | 11/1974 | France | 210/748 |
| 2471953 | 6/1981 | France | 210/696 |
| 58-95503 | 6/1983 | Japan | 210/748 |
| 58-95519 | 6/1983 | Japan | 210/748 |
| 929139 | 5/1982 | U.S.S.R. | 204/155 |
| 1428709 | 10/1988 | U.S.S.R. | 204/155 |
| 14459 | 9/1931 | United Kingdom | 210/748 |
| 606154 | 8/1948 | United Kingdom | 210/748 |

OTHER PUBLICATIONS

Publication by Professor H. Freundlich, "Industrial Application of Supersonic Vibrations", Publication presented at the Geological Society, Burlington House, London, England on 11-30-1937.

"Grant & Hackh's Chemical Dictionary", Hackh et al, Copyright 1987, McGraw-Hill Inc., pp. 371, 491 and 492.

"Handbook of Chemistry & Physics", 68th Edition, 1987-88.

"Fundamentals of Physics", Halliday and Resnick, 1974, p. 323.

Primary Examiner—Frank Spear
Assistant Examiner—Joseph Drodge
Attorney, Agent, or Firm—Foley & Lardner

[57] ABSTRACT

A method and system for utilizing electromagnetic energy to inhibit, prevent, reverse, or alter the formation of rust or scale on various liquid contacting surfaces is disclosed. An electromagnetic signal at a frequency related to the energy absorption/emission characteristics of the liquid being treated are directed into the liquid. The frequency of the treatment signal, preferably between 0.1 KHz and 1000 MHz, may be changed if the absorption/emission profile of the liquid changes during treatment.

12 Claims, 4 Drawing Sheets

METHOD AND SYSTEM FOR VARIABLE FREQUENCY ELECTROMAGNETIC WATER TREATMENT

CROSS-REFERENCES TO RELATED APPLICATIONS, IF ANY

This is a continuation-in-part application of U.S. Pat. application Ser. No. 07/183,919 filed on Apr. 20, 1988 now U.S. Pat. No. 4,865,748.

BACKGROUND OF THE INVENTION

This invention relates generally to the treatment of water or other liquids for the purpose of preventing rust, and scaling of various liquid contacting surfaces. More particularly, the invention provides an electromagnetic water treatment method and system whereby water is treated by an electromagnetic signal, the frequency of which has been determined to provide optimal absorption and/or emission of energy by the particular atomic and molecular matter present in the system.

The invention is particularly applicable where inhibition or reversal of rust or scale is desired. Thus, the invention will be described herein with specific reference to the inhibition or reversal of rust and/or scale. It must be appreciated, however, that the invention has broader utility and may be used in a variety of applications including virtually any application wherein electromagnetic energy is used to bring about a reduction in biological/chemical oxygen demand; to alter the ionization or reactivity of other elements including but certainly not limited to copper, gold, carbon and platinum; to alter the electromechanical characteristics of water or other liquids; or to control the solubility of various substances within water or liquids.

The prior art is replete with electromagnetic water treatment methods and devices. Many such methods and devices employ electromagnetic energy of fixed frequency. Examples of such fixed frequency devices are disclosed in U.S. Pat. Nos. 4,659,479; 4,347,133; 4,228,323; 4,365,975; 4,582,629; 2,939,830; 4,151,090; 4,427,544; 4,407,719; and 3,715,305.

Several other United States patents disclose specific methods and/or devices which employ varied and/or mixed frequency electromagnetic energy. For example, U.S. Pat. No. 3,511,776 issued to Avampato discloses a method of using various wave lengths of electromagnetic energy, mostly within the ultraviolet and x-ray spectra, to cause ionic species within a flowing water system to become more susceptible to attraction by a subsequent magnetic field.

U.S. Pat. No. 3,625,884 issued to Waltrip discloses a sewage treatment method which employs multiple signal generators to simultaneously provide audio frequency and/or radio frequency energy at a number of different frequencies. The frequency output of each separate signal generator may be selected on the basis of the mineral content of the untreated sewage.

U.S. Pat. No. 4,365,975 issued to Williams et al. discloses a method of recovering alkali metal constituents from coal gasification residues by subjecting the residues to electromagnetic energy in the radiofrequency-microwave ($0.1-10^5$ MHz) range. Such electromagnetic radiation is purported to facilitate extraction of the metal.

Additionally, U.S. Pat. No. 3,767,545 issued to Lucero discloses a device which uses ultraviolet radiation to make certain ions more susceptible to magnetic attraction. Lucero recognizes that, theoretically, there exists a preferred wavelength for each ion that is to be rendered more susceptible to magnetic attraction. Lucero utilizes a separate magnet and a vortex inducing apparatus to separate undesired ions from a flowing water stream.

In general, the methods and devices of the prior art utilize electromagentic energy to bring about various effects on atomic or molecular matter contained in a solution or suspension. One of the purported advantages of many such prior art electromagnetic devices is that they eliminate or reduce the need for the addition of chemical water treatment agents. However, many of the prior art methods and devices have proven to be only minimally or sporadically effective in certain applications. Additionally, the prior art devices and methods are, in many cases, confounded by technical complexity making such devices and methods expensive to manufacture and difficult to install.

SUMMARY OF THE INVENTION

The present invention overcomes the above-stated shortcomings in the art by providing a versatile and relatively simple method and system for employing variable frequency electromagnetic energy to treat various liquids and to inhibit or reverse the formation of rust or scaling of various liquid-contacting surfaces. More fundamentally, the present invention provides a method for determining the optimal electromagentic frequency to be employed in the electromagnetic treatment of a liquid, such optimal frequency being a function of the particular atomic and/or molecular matter present in the treated fluid. The method of the present invention may be employed to qualitatively and/or quantitatively alter the formation of various chemical compounds within the fluid or on fluid-contacting surfaces.

In accordance with one embodiment of the present invention, there is provided an electromagnetic fluid treatment method whereby electromagnetic signals of known current intensity and varying frequency are initially directed into a fluidic system such as a water boiler, hot water tank, industrial water system, or the like. Such signals may be provided directly via one or more probes extending into the fluid, may be provided indirectly via attachment point(s) on various fluid contacting surfaces or may be applied by any other means capable of directing the desired electromagnetic energy into the fluid. The current intensity of the signals is subsequently measured at a separate location some distance from the point(s) at which the signals are initially delivered. As the signal frequency is varied, the current intensity measured at the separate location will typically vary above and below the known current intensity of the signals. Such measured variations in current intensity relative to the corresponding variations in signal frequency provide a "profile" of the energy absorbing and/or emitting characteristics of the particular atomic and molecular matter dissolved or suspended within the liquid. The frequencies at which maximal absorption and maximal emission are observed—or any other selected frequency—may then be utilized, solely or interchangeably, for subsequent electromagnetic treatment of the liquid.

In accordance with another aspect of the invention, the relationship between current absorption and/or emission and the frequency of the signal may be periodically redetermined. Based on such redeterminations, adjustment(s) in treatment frequency may be made during the course of the treatment period. Such periodic optimization of the treating frequency insures that the most effective anti-scaling effects will be maintained during the ongoing treatment.

In accordance with an even further aspect of the present invention, the initial test signals may be generated by any type of variable frequency electromagnetic generator capable of generating signals within effective frequency ranges. A broad range (e.g. 0.1 KHz to 1000 MHz) is sufficient for water containing systems in general. Signal generators having narrower frequency ranges such as 0.1 KHz-100 MHz or 0.1 KHz-500 MHz may, of course, be employed, depending upon solute content of the liquid and the specific application involved. The electromagnetic signals utilized by the present invention may be delivered by way of probes which extend directly into the liquids, or by way of attachment points located on liquid contacting surfaces capable of transmitting the signal into the liquids. In large installations such as industrial boilers and the like, multiple probes or attachment points may be utilized to insure that the signals are uniformly transmitted throughout the entire installation.

Still further in accordance with the present invention, the current intensity measurements may be made by any current measuring device capable of measuring within applicable ranges. The use of an oscilloscope may be advantageous where visualization of the waveform is desirable, however, a simple milliammeter will generally be an acceptable current measuring device for the present invention.

Still in accordance with an alternate embodiment of the present invention, the measuring device, whether it be an oscilloscope, milliammeter, or other device, may be omitted from the system. In such an embodiment, the generator generates a signal at the approximate optimum frequency for the desired effect or treatment of the fluid. This type of operation may be conducted in situations where a known frequency has been used in other similar systems and omitting continuous measurement, redetermination and readjustment of the treatment frequency does not seriously reduce the effectiveness of the system.

The mechanism by which the present invention functions is at least partially explainable on the basis of the theory of quantum electrodynamics. In general, quantum electrodynamic theory speaks to the manner in which electromagnetic fields interact with atoms and molecules, as well as the resultant interactions between molecules. The theory of quantum electrodynamics is, in part, based on the relation between the energy of a quantum of light, the photon, and the frequency of any electromagnetic field corresponding to it. In applying quantum electrodynamics to the present invention, it must be recognized that dynamic electromagnetic fields are known to interact with the various charged particles which form constituents of atoms and molecules (i.e. electrons). As a result, the external application of an electromagnetic field will bring about various disruptions of the internal fields which are responsible for the particular atomic or molecular structure and the interrelationships of the charged particles therein. Thus, depending upon the atomic or molecular matter present, the energy absorption/emission characteristics of a solution will vary as the frequency of the external electromagnetic field is varied. By setting the frequency of an externally applied electromagnetic signal to maintain a specifically desired level of absorption or emission within a solution or suspension, the intended effects of the electromagnetic field may be optimized.

Accordingly, a principal object of the present invention is to provide a method and system for treating liquid with an electromagnetic signal, the frequency of which has been determined to correspond with a desired level of absorption or emission of energy by the particular atomic and/or molecular matter contained in the liquid. In most cases, the desired treatment frequency will be the frequency at which maximum current absorption is observed.

It is a further object of the present invention to provide a method for optimizing the efficacy of various electromagnetic liquid treatment devices by providing a method for operating such devices at frequencies which have been specifically determined to provide optimal absorption or emission of energy by the particular atomic and molecular matter contained within water or other liquids being treated.

Another object of the present invention is to provide a convenient method and system for utilizing electromagnetic energy for the purpose of inhibiting the formation of rust or scale on various fluid contacting surfaces.

Yet another object of the present invention is to provide a convenient method and system for altering, reversing and/or removing existing rust, and/or scale from fluid contacting surfaces.

A still further object of the present invention is to provide a frequency-optimized electromagnetic liquid treatment method which is effective to prevent, inhibit or reverse the formation of rust and scale on liquid contacting surfaces regardless of whether the liquid remains static or is permitted to flow within the system.

An additional object of the present invention is to provide a system which may be used in an application where the approximate frequency or effective frequency for the given desired treatment is known and measuring and adjustment are unnecessary.

Additional objects and advantages of the invention will become apparent to those skilled in the art upon consideration of the accompanying drawings and the detailed description and examples which follow.

DETAILED DESCRIPTION

Figure 1:
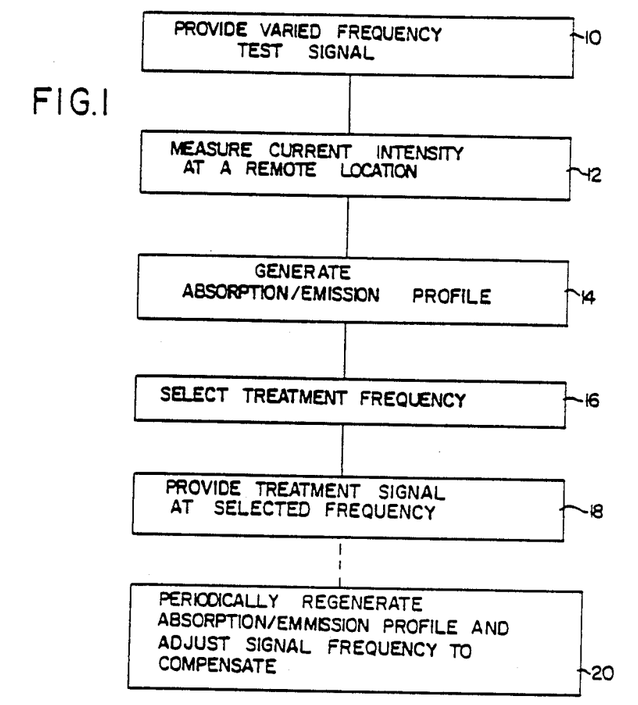
FIG. 1 is a flow diagram outlining a preferred method of the present invention.

Referring now to the drawings wherein the showings are for purposes of illustrating preferred embodiments of the invention and not for purposes of limiting the same, FIG. 1 outlines a preferred liquid treatment method of the present invention in block diagram form which, for purposes of explanation, comprises a water treatment system. The initial step of providing varying frequency test signals 10 may, depending upon the frequency range desired, be accomplished by a variety of devices capable of generating electromagnetic energy. However, it is typically preferable to utilize a signal generator capable of providing electromagnetic energy within the radiofrequency band. Such frequency range is generally sufficient to develop a usable absorption/emission profile for most water systems. The signal generating device is directly or indirectly connected to the water being treated. The term "absorption/emission" profile as used herein means a visual or recorded summary of the absorption and emission characteristics of the liquid being treated for each of the test signals generated by the generator.

The second step of measuring current intensity at a remote location 12 is accomplished by connecting any appropriately calibrated current measuring device to a point in the system where it will directly or indirectly sense the current intensity of the signal within the water being treated. The water between the point at which the test signals are provided 10, i.e. "signal application point", and the remote location at which the current intensity is measured, i.e. "current measurement point", should be consistent and non-disrupted. Closed valves or large air filled voids within the water may disrupt the signal and result in distorted or erroneous current intensity readings. The water between the signal application point and the current measurement point may be either standing or flowing, provided that consistency, i.e. a steady state condition, is maintained. Although any type of device capable of measuring current intensity in the relevant range may be used, the preferred embodiment employs an oscilloscope whereby the waveform of the signal may be visualized and additional waveform measurements may be made as required. In many cases a simple milliammeter will be an appropriate instrument for measuring current intensity at the remote location 12. The current measured at the remote location will vary as the frequency of the test signal varies. Such current variations relative to signal frequency are indicative of absorption or emission of energy by the atomic and molecular species present in the water. Thus, the measured current intensity relative to the corresponding test signal frequencies will generate an absorption/emission profile 14. Such profile, in most cases, will extend over a frequency range of approximately 1 KHz to 100 MHz; however, any applicable frequency range may be employed.

After the absorption/emission profile has been generated, the next step is to select a treatment frequency 16. In most cases it is desirable to select the frequency at which maximal absorption of current is observed. Such is referred to as the maximal absorption frequency. It should be appreciated, however, in specific cases it may be desirable to select the observed maximal emission frequency or any other treatment frequency, the selection of which is made on the basis of the previously generated absorption/emission profile.

After selecting the treatment frequency, an electromagnetic signal generator is set to provide a treatment signal at the selected frequency 18. Usually, a single variable frequency signal generator is used to provide the test signals 10 as well as the subsequent static frequency treatment signal 18.

After the water has been treated for a reasonable period of time, the operator may optionally repeat steps 10 through 14, thereby periodically regenerating absorption/emission profile data. If such newly generated absorption/emission profile data indicates a change in maximal absorption or emission frequency has occurred, the treatment frequency may be adjusted correspondingly.

Figure 2:
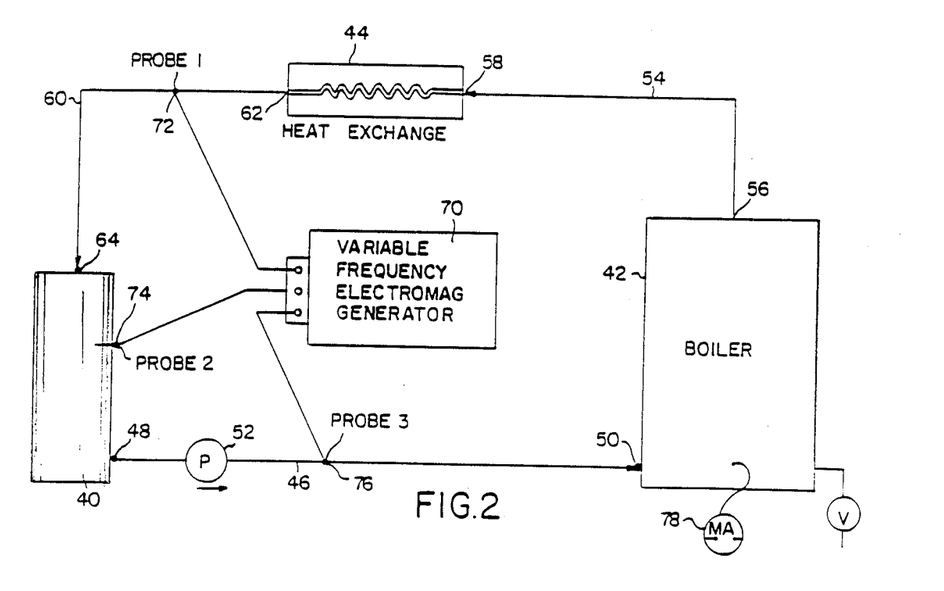
FIG. 2 is a schematic diagram of a preferred system of the present invention.

FIG. 2 shows a schematic diagram of a preferred embodiment wherein a system of the present invention is used to treat an industrial boiler system. The system comprises a condensate tank 40, a boiler 42, and a heat exchanger 44. A water line 46 fluidly connects outlet port 48 of condensate tank 40 to the inlet port 50 of boiler 42. A transfer pump 52 is positioned within water line 46 for the purpose of pumping water from condensate tank 40 into boiler 42. A steam line 54 connects the steam outlet port 56 of boiler 42 to the inlet end 58 of coil-type heat exchanger 44. The steam condenses within the heat exchanger and a condensate line 60 carrying the condensate from the outlet end 62 of heat exchanger 44 to the inlet port 64 of condensate tank 40. Thus, the subject boiler system comprises a closed, continually recirculating hot water boiler arrangement.

A variable frequency electromagnetic generator 70 is connected to three separate signal output probes. A first probe 72 located within condensate line 60, a second probe 74 extends through the wall of condensate tank 40 and a third probe 76 is located within water line 46.

A milliammeter 78 is positioned so as to be in operative contact with the water circulating into boiler 42 thereby providing a means of measuring the current intensity of an electromagnetic signal emitted by signals generator 70 and directed into the water by probes 72, 74 and 76. Of course, an oscilloscope or any other current measuring means may also be employed for this purpose.

As the frequency of the electromagnetic signal emitted by generator 70 is varied, the corresponding absorption/emission profile may be determined on the basis of the current measured by milliammeter 78 relative to the varied frequency of the electromagnetic signal. By such method, a complete absorption/emission profile for the system may be obtained and the signal frequency which produces maximal absorption or emission of energy may be determined.

A number of experiments were performed for the purpose of assessing and demonstrating the effects of various embodiments of the present invention. The particulars of several such experiments are set forth in the following examples and the additional drawings which correspond therewith.

EXAMPLE 1

Figure 3:
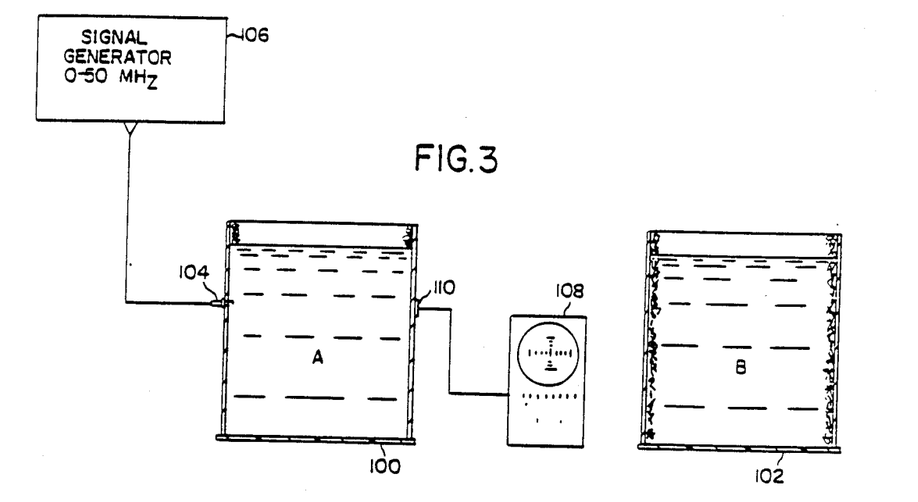
FIG. 3 is a diagramatic representation of the experimental system described herein as Example 1.

Referring to FIG. 3, two cut sections of heavily scaled pipe, labeled A and B, were removed from a commercial boiler. Plexiglass bottoms 100, 102 were bonded by silicone cement to one end of each pipe section, thereby forming separate, open-topped cylindrical containers having water-tight bottoms. A spark plug 104 was tapped through the wall of container A so as extend fully through the container wall. Both containers A and B were filled with tap water. A 0 to 50 MHz variable frequency electromagnetic generator 106 was attached to the spark plug 104. An oscilloscope 108 was attached to the first pipe section at a second point 110 some distance from the spark plug. A plurality of 20 volt (peak to peak) electromagnetic signals of varying frequency were then directed into the spark plug 104 and the current intensity at the second point 110 was measured by oscilloscope 108 so as to discern the absorption/emission profile of the water.

On the basis of such absorption/emission profile, it was determined that the initial maximum absorption frequency in water filled container A was 21±1 MHz. Thereafter, the signal generator was set at 21 MHz and a static 21 MHz signal was thereafter consistently directed through spark plug 104.

The tap water in both vessels A and B was changed every one or two days. Vessel A, into which the 21±1 MHz electromagnetic signal was directed, demonstrated steady descaling at a rate of approximately 1/16 inch per week while no descaling was observed in the untreated pipe section. It is concluded that, in this experiment, electromagnetic treatment at the initially determined maximal absorption frequency was effective to substantially reduce the thickness of previously deposited scale.

EXAMPLE 2

Figure 4:
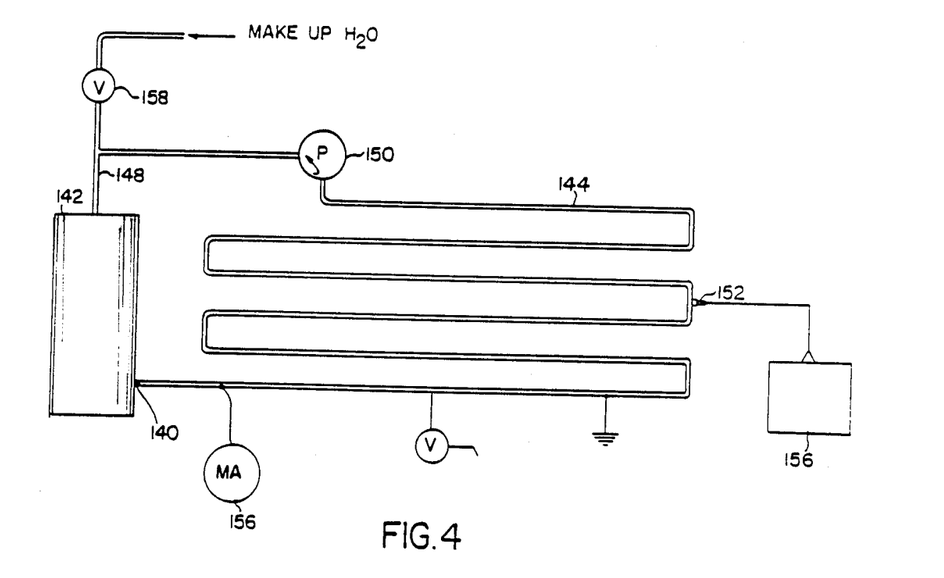
FIG. 4 is a diagramatic representation of the experimental system described herein as Example 2.

Referring to FIG. 4, the outlet port 140, a hot water heater 142 was connected to one end of a 220 foot long section of galvanized iron pipe 144. The opposite end of pipe section 144 was connected to the inlet line 148 of hot water heater 142. A recirculating pump 150 was positioned in line 144 so as to continually recirculate water from the outlet 140 of water heater 142, through the entire length of line 144 and again into water heater 142 via inlet line 148. A spark plug 152 was tapped through a wall of the pipe at its approximate midpoint and a variable frequency electromagnetic signal generator 154 was attached to the spark plug. A milliammeter 156 was attached to line 144 at a point some distance from the point at which spark plug 152 was mounted. The system was filled with tap water and pump 180 was activated. Electromagnetic signals of varying frequency, ranging from 1 KHz to 100 MHz, were then directed through the spark plug 152 with water continually circulating through the system. A milliammeter 156 was utilized to determine the current absorption/emission profile of the water. The maximum absorption frequency was determined to be 28.5 MHz. Thereafter, the signal generator 154 was set to generate a signal at the previously determined maximum absorption frequency of 28.5 MHz for a period of seven days during which time the recirculating pump was continually run. Quantities of make-up tap water, individually comprising about ten percent of the system volume, were added to the system each day through a water inlet valve 158 located in the inlet line 148 of the water heater 142.

Prior to the experiment, it had been determined that visible scale of approximately ⅛ inch existed on the inner surfaces of the hot water heater tank 142. After seven days of frequency optimized treatment by the present invention, the previously scaled water heater surfaces were essentially clear of scale.

EXAMPLE 3

Figure 5:
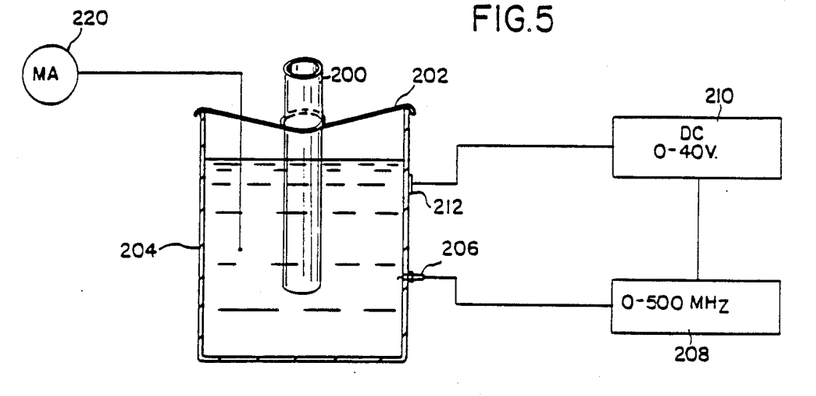
FIG. 5 is a diagramatic representation of the experimental system described herein as Example 3.

Referring to FIG. 5, a section of galvanized pipe 200 having approximately ⅛ inch of scale deposited on its inner surface was removed from an institutional boiler system. The section of pipe 200 measured 12 inches in length and approximately ¾ of an inch in diameter. The removed pipe section 200 was suspended by iron wire 202 from the top of a water filled iron container 204 so as to be mostly immersed in the water without contacting the sides of the container. A spark plug 206 was tapped through one wall of the container and a 0–500 MHz variable frequency signal generator 208 was attached to the spark plug. The signal generator was powered by 0–40 volt DC power source 210. The power source 210 was grounded to the wall 212 of the metal container.

Maximum absorption and emission frequencies were determined by varying the frequency of signal generator 208 while measuring the current intensity of the signals within the water using milliammeter 220. The maximum absorption frequency was determined to be 40.5 MHz while maximum emission was observed at 11.0 MHz. Treatment was thereafter delivered, alternating from day to day between such previously determined maximum absorption frequency and maximum emission frequency. After nine days of such alternating maximum absorption/maximum emission treatment, the scale which had been observed on the inner surface of pipe 200 was no longer present.

EXAMPLE 4

Figure 6:
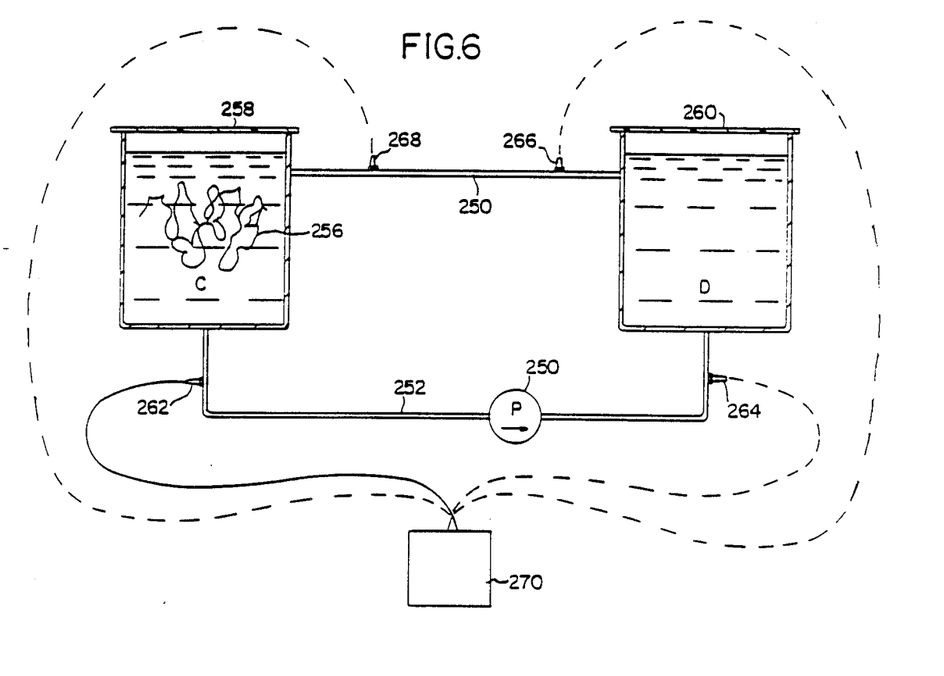
FIG. 6 is a diagramatic representaion of the experimental system described herein as Example 4.

Referring to FIG. 6, two open containers C and D were joined by a section of galvanized ⅜-inch pipe 250 running through the wall of each container C and D near the upper rim thereof. The containers C and D were filled with tap water such that the water level in each container was above the respective inlet point of pipe 250. A separate polypropylene return line 252 was positioned to connect containers C and D, fluidly extending through the bottom of each container. A recirculation pump 254 was positioned within polypropylene return line 252 so as to continually recirculate water from container C through the polypropylene line 252 into container D and subsequently out of the top of container D through the galvanized connecting pipe 250 and again into container C.

A section of uncoated iron wire 256 was immersed in the water contained in container C. plexiglass lids were bonded over the tops of containers C and D, thereby providing a substantially water-tight, recirculating system. The circulation of tap water within the system was maintained at a rate of approximately 20 gallons per minute by recirculation pump 254. Spark plugs 262, 264, 266 and 268 were tapped through various points in the walls of pipe 250 and polypropylene return line 252 as shown. A 0–50 MHz variable frequency electromagnetic generator 270 was initially connected to spark plug 262.

With no signal generated, the wire 256 rusted and turned a reddish-orange color in approximately three days. When a signal of 20.0 MHz was generated and directed through spark plug 262 for a period of 24 hours, the rust disappeared and the wire appeared bare. When the frequency was changed to 40.5 MHz for another 24 hours, the wire turned black with $Fe_3O_4$ deposits and, following another 24 hours at 35 MHz the wire exhibited red $Fe_3O_4$ deposits.

The experiment was thrice repeated, putting the same frequency signals through each of the three remaining spark plugs 264, 266 and 268 and the results in each case were the same.

EXAMPLE 5

Figure 7:
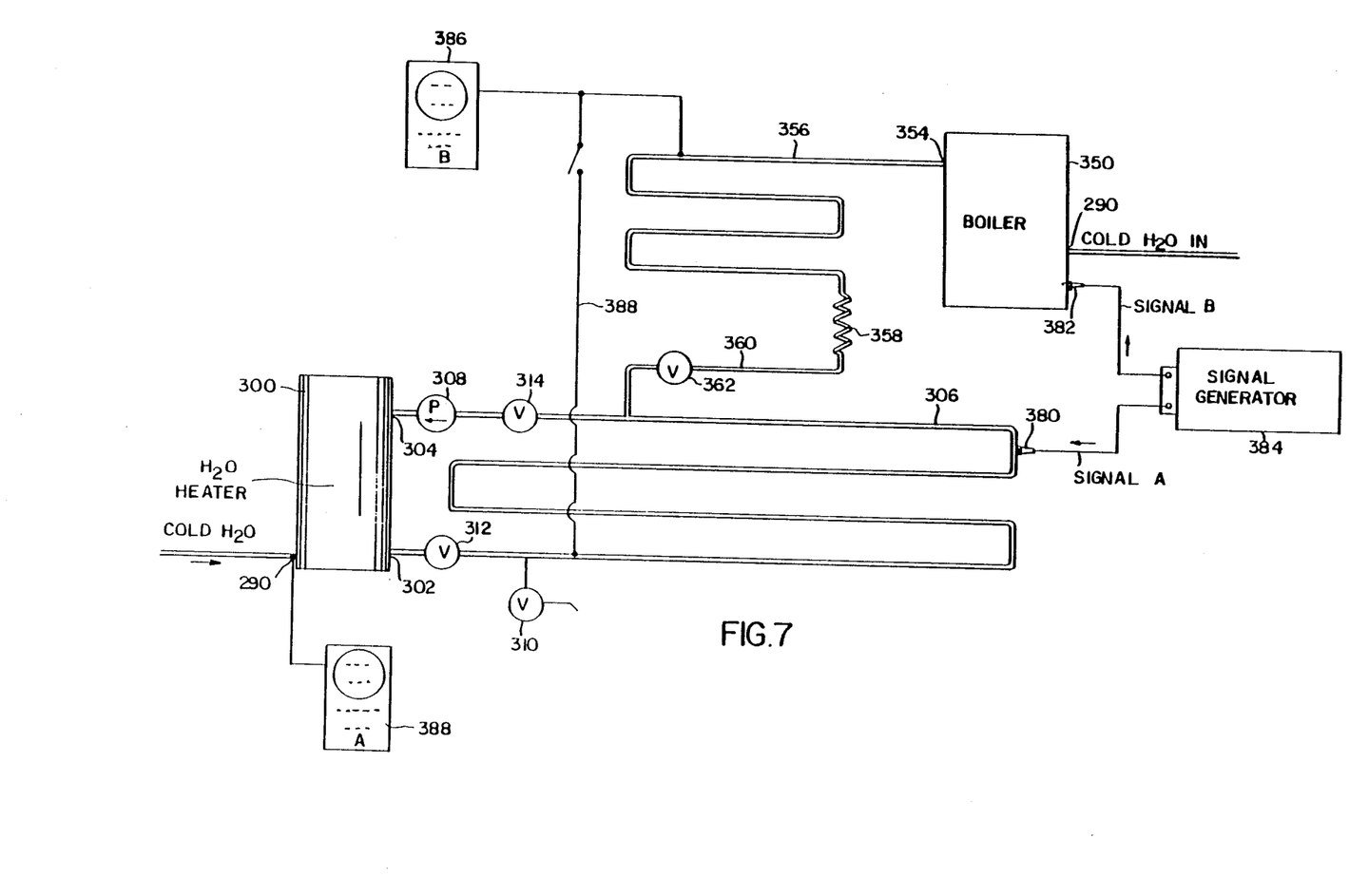
FIG. 7 is a diagramatic representation of the experimental system described herein as Example 5.

A separate experiment was designed to test the continuity of the signal as it travels through a typical industrial boiler system as outlined in FIG. 7. A water heater tank 300 having an outlet port 302 and an inlet port 304 was connected to approximately 200 feet of galvanized one inch steel pipe 306 such that the pipe 306 would extend between the outlet port 302 and the inlet port 304 of tank 300. A transfer pump 308 was positioned within line 306 to provide for a continual recirculation of water from the tank 300 through the pipe 306 and back into tank 300. A valved drain port 310 was also located at the base of pipe 306 and two-way valves 312 and 314 were positioned at opposite ends of pipe 306.

The boiler 350 included a water inlet 352 and a steam outlet 354. Steam line 356 was connected to the steam outlet 354 of boiler 350 and through a coil-type condenser 358. The outlet end of condenser 358 was connected to a condensate line 360. The condensate line was connected to line 306 by way of a "T" connection. A two-way valve 362 was positioned in line to permit control of the condensate flow through line 360 into pipe 306. A first spark plug 380 was tapped through the wall of pipe 306, while a second spark plug 382 was tapped into the water containing tank portion of boiler 350.

A two channel electromagnetic generator 384 was operatively connected to spark plugs 380 and 382. A first signal (signal A) was emitted by channel 1 of generator 384 and was directed through spark plug 380, while a second signal (signal B) was emitted through channel 2 of generator 384 and directed through spark plug 382. A first oscilloscope 386 was connected to the approximate mid-point of steam line 356, while a second oscilloscope 388 was connected to the cold water inlet 290 of water tank 300. The water tank 300 and water line 306 were consistently filled with recirculating water. Thus, signal A is input directly via spark plug 380 into the water flowing through pipe 306.

Signal A was received and displayed by scope A with no change in frequency, however, a diminution in amplitude ranging from 10% and 100% was observed. Such dimunution in amplitude was frequency dependent. At frequencies of $10^7$ MHz and above signal A, as monitored by scope A, lost little signal power and no frequency change was observed, provided that the water in tank 300 and line 306 remained constant and valves 312 and 314 remained open to permit continual recirculation of water through water heater 300 and line 306.

Signal B, emitted through spark plug 382 positioned in boiler 350 was measured by scope B to determine the continuity and consistency of signal B as it was transmitted through boiler 350 and the attendant steam line 356 and/or the condensate line 360 and condenser 358. Signal B was received intermittently by scope B when connected through the condensate lines and condenser as shown 388. When, however, scope B was connected to steam line 356, signal B was received without interruption. An approximate fifty percent decrease in signal amplitude—but no change in signal frequency—was observed in steam line 356.

ALTERNATE EMBODIMENT EXAMPLE

As noted above, the milliammeter, oscilloscope or other current measuring device need not be used in situations where known or otherwise consistent conditions exist. For example, in commercial laundries, boilers are used. A frequency of approximately 40 MHz has proven to be useful for treatment of such boilers. Therefore, rather than incorporating measurement and adjustment devices, a 40 MHz signal can be used with such boilers, thereby minimizing the cost and complexity of the system. If desired, spot checking may be used to ensure that no dramatic departures from desired operational characteristics and results occur. This may be done by placing a measuring device on the boiler as described above and going through the measurement steps previously outlined, or by taking samples of the liquid being treated to a test facility to determine if significant changes have affected the absorption/emission profile.

FIG. 2 adequately illustrates such a system, if, for example, milliammeter 78 is eliminated. Again, one or more probes 72, 74, 76 may also be used to direct the energy into the liquid.

The system of the present invention may also be used for shocking a system, e.g. a laundry boiler. By repeatedly activating and de-activating the generator, or by reversing the signal's polarity (or phase), significant effects on descaling rates have been noted.

While the above-described drawings and examples have been included for the purpose of illustrating specific experiments and embodiments of the present invention, those skilled in the art will certainly appreciate that various changes, modifications and applications may be made without departing from the spirit and scope of the invention. For example, the inventive method and system may be used with virtually any of the devices available for treating fluids with electromagnetic energy. Although the experiments described herein routinely employed a simple probe or spark plug as a means of directing the desired electromagnetic frequency into the liquid, many other means of directing such energy into the liquid may be utilized in conjunction with the method and system of the present invention. Accordingly, it is intended to include all such changes, modifications and applications insofar as they come within the scope of the appended claims or the equivalents thereof.

What is claimed is:

1. An electromagnetic treatment for a liquid contained in a system, said method comprising the steps of:
   (a) generating an electromagnetic signal at a frequency preselected in response to the energy absorption/emission profile of said liquid; and
   (b) directing said electromagnetic signal into the liquid contained within the system at a preselected location, through a non-insulated conductor in electrical contact with the liquid.

2. The method of claim 1 wherein the step of generating said signal comprises operatively connecting through said non-insulated conductor in electrical contact with the liquid a variable frequency electromagnetic generator to the liquid.

3. The method of claim 1 wherein the preselected frequency is selected from the range of 0.1 KHz to 1000 MHz.

4. The method of claim 1 wherein the preselected frequency is selected from the range of 0.1 KHz to 500 MHz.

5. The method of claim 1 wherein the preselected frequency is selected from the range of 0.1 KHz to 100 MHz.

6. The method of claim 1 wherein said signal is intermittently directed into said liquid.

7. The method of claim 1 wherein said signal is continuously directed into said liquid.

8. An electromagnetic treatment system for a liquid comprising:
   means for generating an electromagnetic signal at a frequency preselected in response to the energy absorption/emission profile of said liquid; and means for operatively connecting said generating means to said liquid by a non-insulated conductor in electrical contact with said liquid.

9. The system of claim 8 wherein said generating means is operatively connected to at least one conductive probe in direct contact with the liquid.

10. An electromagnetic treatment method for a liquid contained in a system, said method comprising the steps of:

(a) generating an electromagnetic signal at a frequency preselected in response to the energy absorption/emission profile of said liquid; and (b) directing said electromagnetic signal into the liquid contained within the system at a first and second preselected location through a first non-insulated conductor in electrical contact at the first location with the liquid, and through a second non-insulated conductor in electrical contact with the liquid at the second location.

11. A method for the prevention of scaling in a system containing a liquid, said method comprising the steps of:

(a) generating an electromagnetic signal at a frequency preselected in response to the energy absorption/emission profile of said liquid;

(b) directing said electromagnetic signal into the liquid contained within the system at a first and second preselected location through a first non-insulated conductor being in electrical contact at the first location with the liquid, and through a second non-insulated conductor being in electrical contact with the liquid at the second location; and (c) said preselected frequency is selected from the range of 0.1 kilohertz to 1,000 megahertz.

12. A method for the prevention of scaling in a system containing a liquid, said method comprising the steps of:

(a) generating an electromagnetic signal at a frequency preselected in response to the energy absorption/emission profile of said liquid;

(b) directing said electromagnetic signal into the liquid contained within the system at a preselected location, through a non-insulated conductor in electrical contact with the liquid; and (c) said preselected frequency is selected from the range of 0.1 kilohertz to 1,000 megahertz.

* * * * *